(No Model.)
W. H. YOUNG.
MILK AERATOR.
No. 589,774.  Patented Sept. 7, 1897.
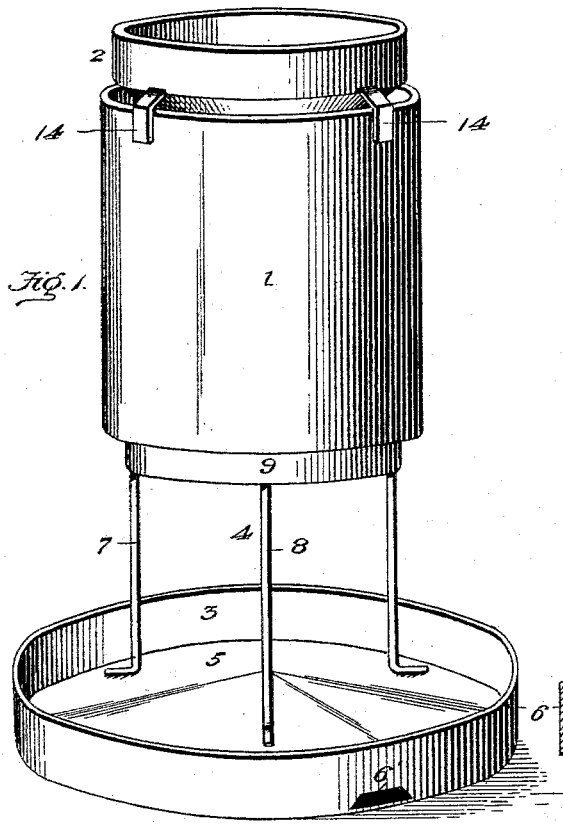
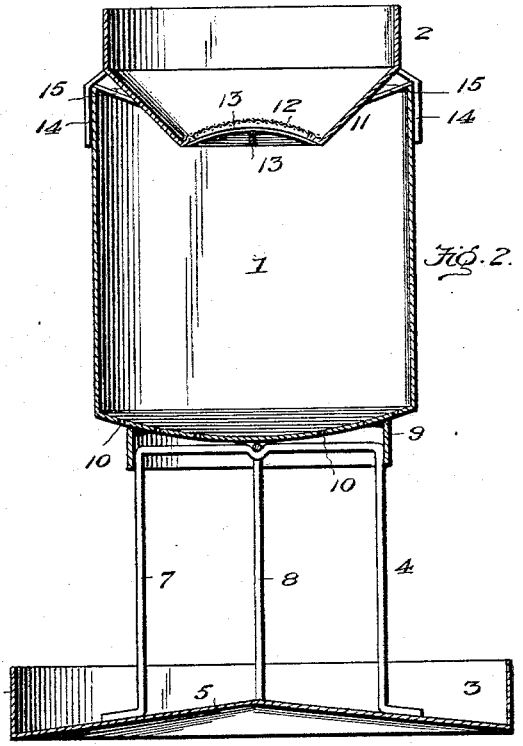
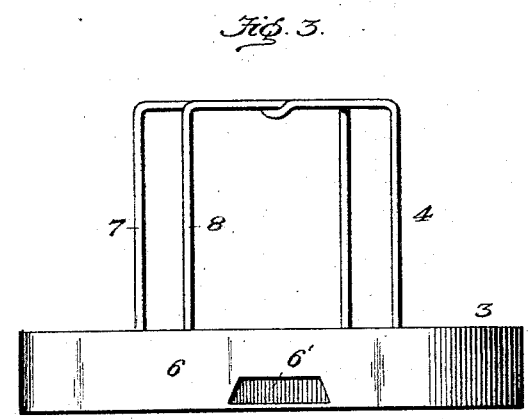
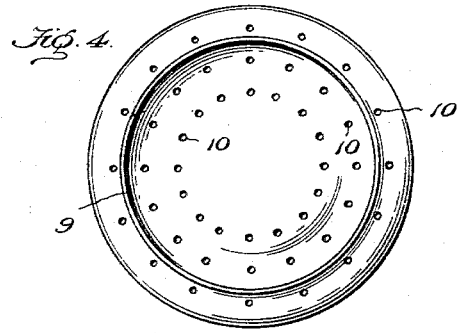
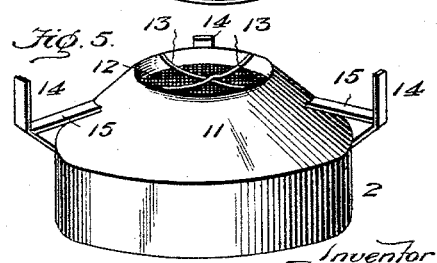
Witnesses:
Inventor:
William H. Young
By Edson Bros.
Att'ys.

UNITED STATES PATENT OFFICE.

WILLIAM H. YOUNG, OF AURORA, ILLINOIS.

MILK-AERATOR.

SPECIFICATION forming part of Letters Patent No. 589,774, dated September 7, 1897.

Application filed June 4, 1897. Serial No. 639,456. (No model.)

*To all whom it may concern:*

Be it known that I, WILLIAM H. YOUNG, a citizen of the United States, residing at Aurora, in the county of Kane and State of Illinois, have invented certain new and useful Improvements in Milk Aerators and Strainers; and I do hereby declare the following to be a full, clear, and exact description of the invention, such as will enable others skilled in the art to which it appertains to make and use the same.

My invention relates to improvements in milk aerators and strainers; and the object that I have in view is to provide a simple and inexpensive construction in which provision is made for thoroughly straining the milk, for dividing the milk into thin streams during its passage through the aerator, and for free circulation of air around and through the thin streams of milk while passing from the reservoir to the tray of the aerator.

Another object of my invention is to provide for the ready and easy separation of the parts, so that access may be had to all the parts of the aerator for the purpose of thoroughly cleaning the same and for drying them previous to storing the device.

With these ends in view my invention consists in the construction and combination of parts, which will be hereinafter fully described and claimed.

To enable others to understand my invention, I have illustrated the preferred embodiment thereof in the accompanying drawings, forming a part of this specification, and in which—

Figure 1 is a perspective view of my improved strainer and aerator. Fig. 2 is a vertical central sectional elevation thereof. Fig. 3 is a view of the tray and stand detached from the reservoir. Fig. 4 is a bottom plan view of the reservoir. Fig. 5 is an inverted perspective view of the strainer.

Like numerals of reference denote corresponding parts in all the figures of the drawings, referring to which—

1 designates the reservoir, 2 is the strainer, 3 is the tray, and 4 is the stand, the detailed construction of which will now be fully described.

The tray 3 has a slightly conical bottom 5, the center or apex of which is in alinement with the axis of the reservoir 1. The tray-bottom has a boundary flange 6, which rises above the apex of the bottom 5, and in this flange, next to the bottom, is produced an outlet-opening 6', through which the strained and cooled milk may flow into a pail or other vessel. On the bottom of the tray is erected the stand 4, that serves to support the reservoir 1 in an elevated position above the tray, and the stand is constructed with small wire legs which offer practically no obstruction to the circulation of air through the thin streams of milk as they pass from the reservoir to the tray. The stand shown in the drawings consists of two pieces of wire 7 8, which are bent to provide legs and cross-bars, and the wires are arranged at right angles, so that the bars thereof cross one another, as shown by Fig. 3, the legs being fastened to the bottom of the tray and the cross-bars being united together, preferably by soldering the parts together. This stand is arranged centrally on the tray and when the reservoir is disconnected therefrom the tray and stand are exposed, so that they may be thoroughly cleaned and dried.

The reservoir consists of a cylindrical vessel having a perforated bottom, an open top, and a flange or rim 9, attached to the bottom, so as to embrace the stand and hold the reservoir thereon. The bottom of the reservoir has a number of circular series of small holes 10, and the flange or rim 9 is attached to the bottom between two adjacent concentric rows of holes. The diameter of this flange 10 is equal to the width across the top of the open wire stand, and the head of the stand is adapted to rest against an imperforate part of the bottom between the rows of perforations, so as to prevent any obstruction to the outflow of milk through the perforations 10. The reservoir rests firmly on the top or head of the stand and the flange 9 fits up to and against the stand, so as to bear against the legs thereof and thus assist in holding the reservoir firmly on the stand. In fact, the annular rim is made to fit tightly on the stand, so as to engage frictionally tightly therewith to overcome any tendency of the reservoir to tilt and slip on the stand, but the parts may be separated by a slight pull, so as to disconnect the reservoir from the stand.

The strainer 2 is an annular shell terminating at its lower end in an inverted conical bottom 11, in the center of which is a large opening covered by wire-gauze or other foraminous material 12, forming the strainer. This gauze 12 is reinforced by the arched crossed wires 13, which are arranged below said gauze and are attached to the bottom 11. The diameter of the strainer-shell is slightly less than that of the reservoir, and the strainer is provided with bent arms 14, which are attached to the outside of the shell at the place where the cone bottom 11 joins the cylindrical shell, said arms being braced by the inclined struts 15. The strainer is placed on the open top end of the reservoir, so that the arms 14 rest upon the top edge of said reservoir and the conical bottom of the strainer extends down into the reservoir to terminate below said open end of the reservoir, an annular space being left between the strainer and the reservoir for the free circulation of air to and from the reservoir.

It will be noted that the strainer is supported on the reservoir to direct the milk therein with a minimum waste of the milk, thus serving somewhat as a funnel to direct the milk into the reservoir, and said strainer may be easily lifted off the reservoir and replaced thereon.

To use the device, the tray is placed on a suitable shelf or table with its flanged edge having the opening 6 extending beyond the shelf or table to enable a pail or other receptacle to be placed beneath the tray, so as to receive the milk as it flows from the tray. The reservoir is placed in an upright position on the stand, so as to be sustained some distance above the tray, and the strainer is placed over the reservoir, on which the strainer is supported by the bent arms. Milk can now be poured into the strainer, so as to leave its solid impurities caught by the gauze 12 and thus retained in the strainer and the milk passes into the reservoir 1. The milk then flows in minute thin streams through the perforations 10 in the bottom of the reservoir and it descends upon and is caught by the tray 3, the conical bottom of which deflects the milk to the side, so that it flows around the channel formed by the conical bottom and the flange toward the outlet-port.

As the milk emerges in thin streams from the reservoir it is exposed to the air, which circulates freely between the reservoir and the tray, and the milk is thus cooled rapidly.

It will be understood that the parts are easily separated to free them, so that they may be washed and then dried by exposing them to the sun or to heat. The parts may be easily assembled together.

The device is simple and durable in construction and cheap of manufacture.

Having thus fully described my invention, what I claim as new, and desire to secure by Letters Patent, is—

1. In a milk aerator and strainer, the combination of a tray, having an outlet at its bottom, a stand erected on the tray, a reservoir having a perforated bottom and an annular depending flange secured to an imperforate portion of the bottom within its outer circumference, and adapted to fit over the outside of the stand and be held in engagement therewith by friction and to be removed therefrom when desired, substantially as described.

2. In a milk aerator and strainer, the combination of a tray having a suitable outlet at its bottom, a stand erected on the tray, a reservoir with a perforated bottom and an annular flange for removably securing it to the outside of the legs of the stand, and a strainer of smaller diameter than the cylinder and provided with depending legs or feet for detachably securing it to said cylinder and to provide a circumferential air-space between it and the cylinder, substantially as described.

3. In a milk aerator and strainer, the tray having a conical bottom and an outlet in one side thereof, a wire stand erected on the tray and having the strands thereof crossing one another at the upper end of said stand, combined with a reservoir having a perforated bottom and an annular flange or rim on an imperforate part of the bottom arranged to fit frictionally tight upon the upper end of said stand, substantially as and for the purposes described.

In testimony whereof I affix my signature in presence of two witnesses.

WILLIAM H. YOUNG.

Witnesses:
JOHN W. SWANCIGER,
COLLINS BROOKS.